Aug. 4, 1959 R. F. BENTLEY 2,897,670
SINGLE INDICATOR AIR GAGE CIRCUIT
Filed Aug. 31, 1956 2 Sheets-Sheet 2
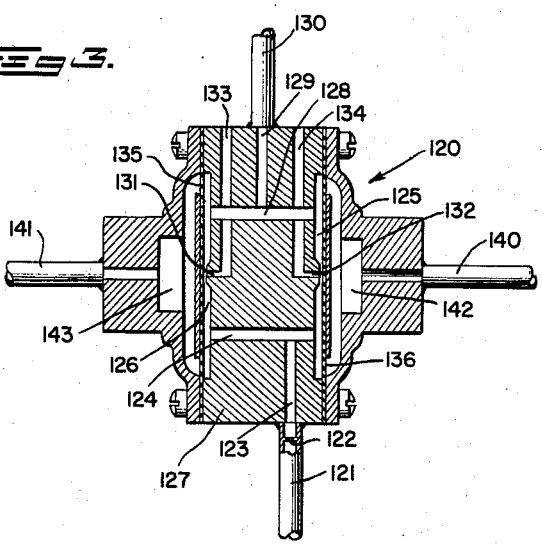
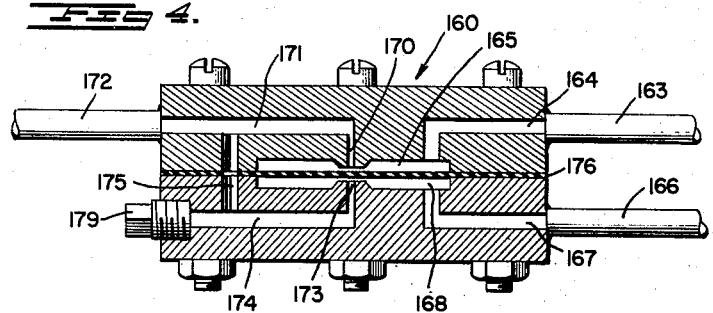
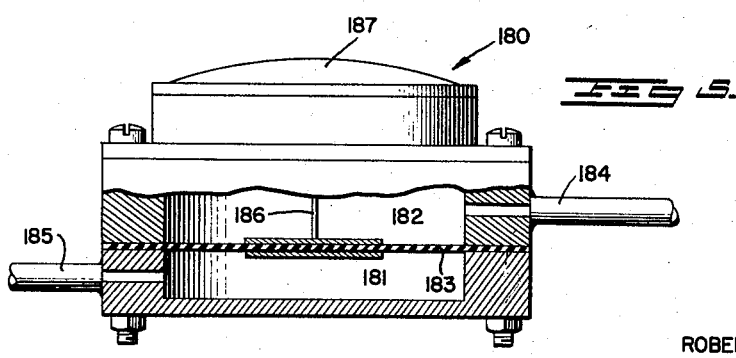
INVENTOR
ROBERT F. BENTLEY
BY *G. L. De Mott*
ATTORNEY

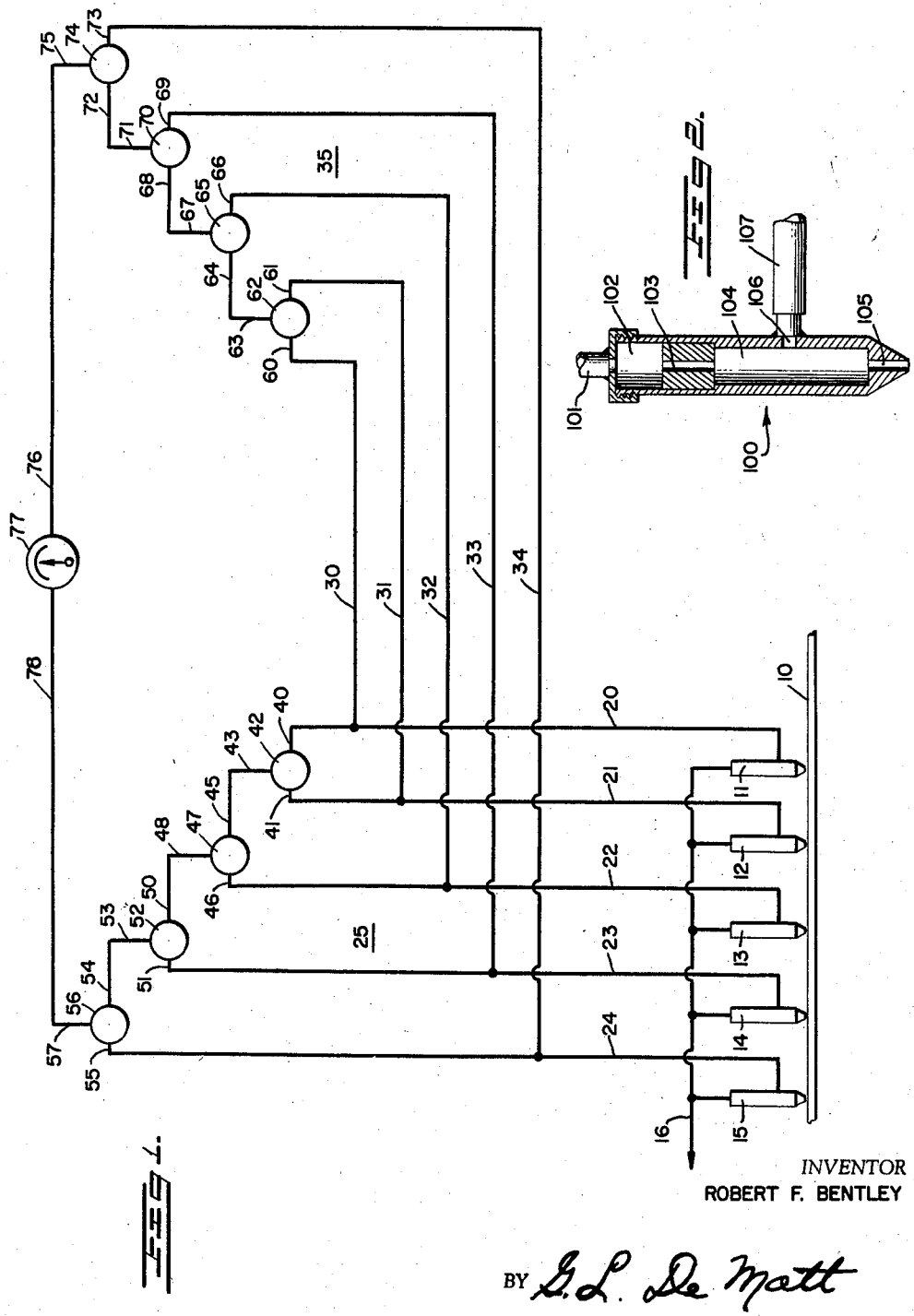

United States Patent Office 2,897,670
Patented Aug. 4, 1959

2,897,670

SINGLE INDICATOR AIR GAGE CIRCUIT

Robert F. Bentley, Pontiac, Mich., assignor to General Motors Corporation, Detroit, Mich., a corporation of Delaware Application August 31, 1956, Serial No. 607,312

9 Claims. (Cl. 73—37.8)

The present invention relates generally to air gage circuits, and more particularly, to circuits wherein a plurality of air gages are employed to give an indication of the relative flatness, concentricity or other dimensional characteristic of a surface.

In present systems employing air gages to determine the flatness of a surface for example, it is customary to obtain individual readings or indications from one or more separate air gages. By mentally computing the difference between the highest and lowest pressures a measure of flatness is obtained. Such systems are time consuming in that the readings are generally sequentially obtained and are subject to error by reason of the fact that numerous readings must be taken and recorded to obtain a substantially correct measure of relative flatness.

It is a principal object of the present invention to overcome the difficulties and the inaccuracies now encountered in air gage measurements by providing an air gage circuit in which a single instantaneous indication is obtained of the flatness, concentricity or like surface characteristic of a work piece.

It is a further object of the present invention to provide an improved, compact air gage circuit employing conventional devices now commercially available.

Still a further object of the present invention is to provide an improved air gage circuit wherein the highest and lowest pressures available from a plurality of gages are readily obtained and combined to give a single indication of a dimensional characteristic of a work piece.

In accordance with the present invention, the back pressures from a plurality of air gages or jets are combined in a high pressure portion of the circuit to obtain a single high pressure, which is indicative of the smallest gap or spacing between any one of the air gages and the work piece under test, and are further combined in a low pressure portion of the circuit to obtain a single low pressure indicative of the largest gap or spacing between any one of the gages and the work piece. The high and low pressures thus obtained are fed to a single indicating device to give a measure of the relative flatness of the work piece under test.

More specifically, the back pressures from two air gages or jets are fed into a first high pressure determining stage from which an output pressure is obtained that is equal to the higher of the two pressures supplied to the stage. This output pressure along with the back pressure of a third jet is fed into a second high pressure determining stage, the output pressure of which is equal to the higher of these two applied pressures. This procedure is continued through a subsequent number of high pressure stages until one high pressure output which has a value equal to that of the highest back pressures available from any one of the air gages is obtained at a final high pressure determining stage. The procedure is duplicated in the low pressure portion of the circuit to obtain a single low pressure output which pressure is the lowest pressure available from any of the air gages.

The two final pressures are then fed into a differential pressure device which reproduces the difference of the pressures as a single indication which may be a dial reading calibrated in terms of relative flatness.

The novel features that are considered characteristic of this invention are set forth with particularity in the appended claims. The invention itself, however, both as to its organization and method of operation as well as additional objects and advantages thereof will best be understood from the following description when read in connection with the accompanying drawings in which:

Figure 1 is a schematic diagram of the air gage circuit of the present invention;

Figure 2 is an elevational sectional view of a back pressure type air gage employed in the circuit of Figure 1;

Figure 3 is a sectional view of a low pressure selector device employed in the circuit of Figure 1;

Figure 4 is a sectional view of a high pressure selector device employed in the circuit of Figure 1; and, Figure 5 is an elevational view partly in section of the pressure differential device employed in the circuit of Figure 1.

Referring now to the drawings and particularly to Figure 1, a work piece 10 of which it is desired to obtain a measure of flatness, for example, is fixedly or movably positioned adjacent a plurality of air gages 11–15, inclusive, which are connected through a conduit 16 to a regulated source of compressed air or other fluid. The air gages 11 through 15 are connected through lines, or conduits, 20 through 24 to a high pressure portion of the circuit, generally indicated at 25, and are further connected through lines 30–34 to a low pressure portion of the circuit generally indicated at 35.

Referring first to the high pressure portion 25, the air gages 11 and 12 have their back pressure lines 20 and 21 connected to the input lines 40 and 41, respectively, of a first high pressure determining stage or device 42 which is more fully described hereinafter. The output line 43 of device 42 from the higher of the two pressures applied to the input lines 40 and 41 is available, and the back pressure line 22 of air gage 13 are connected respectively to the input lines 45 and 46 of a subsequent high pressure selective device 47. The output line 48 of device 47 and the back pressure line 23 of air gage 14 are in turn connected to the input lines 50 and 51 of a further subsequent high pressure selective device 52. The output line 53 of device 52 and the back pressure line 24 of air gage 15 are connected to the input lines 54 and 55 of a final high pressure selective device 56 having an output line 57. The pressure available at output line 57 is the highest pressure available from any of the back pressure lines of the air gages 11 through 15, inclusive.

To obtain the lowest pressure available from the back pressure lines of the gages, lines 20 and 21 of gages 11 and 12 are connected through lines 30 and 31 to the input lines 60 and 61 of a low pressure determining stage or device 62. The output line 63 of device 62 is connected to one of the input lines 64 of a subsequent low pressure determining device 65, and the back pressure line 22 of air gage 13 is connected through line 32 to the other input line 66 of device 65. The output line 67 of device 65 and the back pressure line 23 of air gage 14 are connected to the inputs 68 and 69 of a further subsequent low pressure determining device 70, the back pressure line 23 being connected to the input line 69 through line 33. The output line 71 of device 70 and the back pressure line 24 of gage 15 are connected to the input lines 72 and 73 of a final low pressure determining device 74 provided with an output line 75, the back pressure line 24 being connected to the input line 73 through line 34. The pressure available at the output line 75 is the lowest pressure available from any of the back pressure lines 20 through 24 of the air gages.

The highest of the back pressures which is available at line 57 and the lowest of the back pressures which is available at line 75, are supplied through lines 76 and 78 to a pressure differential device 77 from which a single indication is available to indicate the relative flatness of the work piece 10. Rather than being of the indicator type the device 77 may constitute a signal generator arranged to actuate a selecting mechanism normally employed in automatic processing operations.

It is seen that in the circuit of Figure 1, the input lines of the high and low pressure determining stages 42 and 62 are in parallel with each other and with the air gages 11 and 12. Accordingly, the higher of the back pressures of these gages appears at the output 43 of stage 42, and the lower of the back pressures appears at output 63 of stage 62. These pressures are in turn compared with the back pressure of gage 13 in selector stages 47 and 65, respectively. The pressures at the outputs of these latter stages will be equal to the highest and lowest back pressures available from the three gages 11, 12 and 13. Subsequent comparisons are made until all of the back pressures of the gages have been compared and the highest and lowest of the back pressures obtained. The difference between these final pressures indicates the relative flatness of the work piece under test.

To better understand the operation of the air gage circuit of Figure 1 a brief description follows of the various components which are preferably employed in the air gage circuit.

Referring now to Figure 2 an air gage generally indicated at 100 corresponds to either of the air gages 11 through 15 of Figure 1. The air gage 100 is provided with an air input line 101 that communicates with an air pressure chamber 102 which is maintained at a fixed pressure determined by regulating the pressure in line 101. The regulated air chamber 102 is connected through a restrictor orifice 103 with a back pressure chamber 104 provided with a jet orifice 105. The back pressure chamber has an output orifice 106 which communicates with a back pressure line 107. This line corresponds to either of the back pressure lines 20 through 24 of Figure 1.

In operation of the air gage 100 a compressed and regulated air supply is connected to the chamber 102 through conduit 101. The regulated air pressure in chamber 102 is forced through the restrictor orifice 103 into the back pressure chamber 104 and allowed to bleed to the atmosphere through the jet orifice 105. The orifice 105 is positioned adjacent a work piece such as piece 10 of Figure 1. The amount of air bleeding through orifice 105 will vary with the spacing between the gage 100 and the work piece 10. If the spacing is relatively small a little amount of air will bleed out of the pressure chamber and consequently pressure within the chamber will increase until it reaches a fixed high value. If the spacing is relatively large a greater amount of bleeding will take place and the pressure within the back pressure chamber will decrease to a fixed low value. The highest and lowest values obtainable from the air gage 100 will be gotten in the manner described above in accordance with the present invention by connecting the back pressure line 107 to one of the inputs of a high pressure selector device and one of the inputs of a low pressure selector device.

Referring now to Figure 3, a low pressure selective device corresponding to device 62, for example, of Figure 1 is generally indicated at 120 and is provided with an air supply line 121 that is connected through orifice 122 and passages 123 and 124 to a pair of low pressure chambers 125 and 126 formed in the body 127 of the device. The low pressure chambers in turn are connected through passages 128 and 129 to an outlet conduit or line 130. In addition, the low pressure chambers are connected through nozzle vents 131 and 132 to air vents 133 and 134, respectively. The nozzle vents lie adjacent flexible diaphragms 135, 136 which are capable upon flexing of closing their adjacent nozzle vent.

A pair of input lines or conduits 140 and 141 communicate with pressure chambers 142 and 143 which are separated from the low pressure chambers 125 and 126 by the diaphragms 135 and 136.

In order to provide the lowest pressure in output line 130 that is available at either of the input lines 140 and 141 the device operates as follows:

The two input pressures apply their respective forces to the individual diaphragms 135 and 136 which flex and tend to close the nozzle vents 131 and 132. Opposing the input forces is the output pressure appearing in line 130. This output pressure is equal to the lower of two input pressures. If the output pressure becomes greater than either of the two input pressures it will move the diaphragm acted on by the lowest pressure to uncap the corresponding nozzle and vent the output pressure to the atmosphere. Accordingly, a reduction in the output pressure will take place. If the lower of the two input pressures increases it will move the diaphragm to again cap the nozzle. The vent port is thereby sealed and the output pressure builds up to balance and equal the new value of input pressure. The diaphragm acted on the higher of the two input pressures continually caps its nozzle vent.

The air supply connected to the line 121 should normally be approximately 5 lbs. per square inch higher than the maximum pressure to be selected. If it is desired, the low pressure selector device 120 can be used to select the lowest of three pressures by connecting a third pressure line to line 121 in place of the air supply.

Referring now to Figure 4 the high pressure selector device 160 which corresponds to device 42, for example, of Figure 1 is provided with a first input line 163 that is connected through passage 164 to a pressure chamber 165. The second input line 166 is connected through line 167 to pressure chamber 168. Pressure chamber 165 is connected through orifice 170 and passage 171 to a high pressure output line 172. Similarly, pressure chamber 168 is connected to output line 172 through orifice 173 and passages 174 and 175. A flexible diaphragm 176 separates the pressure chambers 165 and 168 and is capable of capping either orifice 170 or 173. A screw type plug 179 in passage 174 may be removed to provide an alternative output line for the device.

In operation, the diaphragm 176 will cap either orifice 170 or 173 depending upon whether the pressure input in line 163 or line 166 is the higher pressure. Assuming the pressure in line 163 is higher, diaphragm 176 will be flexed downwardly to cap orifice 173 and permit the passage of air from chamber 165, through orifice 170, to the output line 172, the pressure at the output line then being equal to the pressure of line 163.

Referring now to Figure 5, the differential pressure device indicated generally at 180 corresponds to the device 77 in the circuit of Figure 1. The differential pressure device is provided with two pressure chambers 181 and 182 which are separated by a flexible diaphragm 183. A first input line 184 communicates with chamber 182 and a second input line 185 communicates with pressure chamber 181. An actuating rod 186 is secured to the flexible diaphragm 183 and upon movement by the diaphragm actuates a pointer or other indicator visible through face plate 187 of the device.

In operation, any difference in pressure in the output lines 184 and 185 results in a movement or flexing of the diaphragm 183 a predetermined amount dependent upon the difference in pressure. Such movement is transmitted through rod 186 to the pointer to give an indication of the relative difference in the pressures. The value indicated by the pointer may be correlated to give a direct indication of the relative flatness of the work piece under test.

There has been described an air gage circuit having a single indicator which indicates the difference between the highest and lowest pressures available from a plurality of air gages. The manner in which the air gages are positioned about the work piece does not affect the output of the circuit by reason of the fact that the highest and the lowest pressures available in the back pressure chambers of the air gages are selected independent of the arrangement of the air gages.

While the system as illustrated shows five air gages, it is obvious that the invention is not limited to this precise number. In addition, the high and low pressure selective devices may have more than two inputs so that a fewer number of devices can be employed with the same number of air gages to provide a more compact arrangement. Alternatively, a higher number of air gages can be employed with the same number of high and low pressure selective device if the devices have more than two inputs.

What is claimed is:

1. An air gage system for measuring the flatness of a surface comprising a plurality of air gages each having a back pressure chamber therein, a first pressure selective device connected to the back pressure chambers of two of said plurality of air gages, a second pressure selective device connected to said first pressure selective device and to the back pressure chamber of a third of said plurality of gages, said second pressure selective device having an output proportional to the smallest of the spacings between said surface and any one of said plurality of air gages; a third pressure selective device connected in parallel with said first pressure selective device, a fourth pressure selective device connected to said third pressure selective device and to the back pressure chamber of said third of said plurality of gages, said fourth pressure selective device having an output proportional to the largest of the spacings between said surface and any one of said plurality of air gages, and means coupled and responsive to the outputs of said second and said fourth pressure selective devices.

2. An air gage measuring system having a high pressure portion and a low pressure portion and including a plurality of air gages having back-pressure chambers therein; a first high pressure determining device in said high pressure portion having at least two inputs and an output, means connecting each input of said first high pressure device to individual back-pressure chambers of at least two of said plurality of air gages, a second high pressure determining device in said high pressure portion having at least two inputs and an output, means connecting the output of said first high pressure device to one of the inputs of said second high pressure device and means connecting another of the inputs of said second high pressure device to the back-pressure chamber of a further one of said plurality of air gages; a first low pressure determining device in said low pressure portion having at least two inputs and an output, means connecting said inputs of said first low pressure device in parallel with the inputs of said first high pressure device, a second low pressure determining device in said low pressure portion having at least two inputs and an output, means connecting the output of said first low pressure device to one of the inputs of said second low pressure device and means connecting another of the inputs of said second low pressure device to the back-pressure chamber of said further one of said air gages; a pressure differential device having at least two inputs, means connecting one of the inputs of said pressure differential device to the output of said second high pressure determining device and means connecting another of the inputs of said pressure differential device to the output of said second low pressure determining device.

3. An air gage measuring system including at least three air gages having back-pressure chambers therein; a first high pressure determining device having two inputs and an output, means connecting one of said two inputs to the back-pressure chamber of a first of said air gages, means connecting the other of said two inputs to the back-pressure chamber of a second of said air gages; a second high pressure determining device having two inputs and an output, means connecting the output of said first high pressure device to one of the inputs of said second high pressure device and means connecting the other input of said second high pressure device to the back-pressure chamber of a third of said gages; a first low pressure determining device having two inputs and an output, means connecting the inputs of said first low pressure determining device in parallel with the inputs of said first high pressure determining device; a second low pressure determining device having two inputs and an output, means connecting the output of said first low pressure device to one of the inputs of said second low pressure device and means connecting the other input of said second low pressure device to the back-pressure chamber of said third of said gages; a pressure differential device having two inputs and means connecting the output of said second high pressure device and the output of said second low pressure device to the inputs of said pressure differential device.

4. An air gage measuring system including a plurality of air gages having back-pressure chambers therein, a high-pressure determining stage having at least two inlets and a high-pressure outlet, a low-pressure stage having at least two inlets and a low-pressure outlet, means connecting one of the inlets of said high-pressure stage to the back-pressure chamber of one of said plurality of gages, means connecting another of the inlets of said high pressure stage to the back-pressure chamber of another of said plurality of gages, means connecting the inlets of said low-pressure stage in parallel with the inlets of said high-pressure stage, a pressure differential indicating device having at least two inlets, means connecting the outlet of said high-pressure stage to one of the inlets of said pressure differential indicating device, and means connecting the outlet of said low-pressure measuring stage to another of the inlets of said pressure differential indicating device.

5. An air gage measuring system for determining the difference between the highest and lowest pressures obtainable from a plurality of air gages comprising in combination, a pressure differential indicating device having at least two inlets, a high-pressure stage having at least two inlets and a high-pressure outlet, a low-pressure stage having at least two inlets and a low-pressure outlet, means connecting the outlet of said high-pressure stage to one of the inlets of said pressure differential indicating device, means connecting the outlet of said low pressure stage to another of the inlets of said pressure differential indicating device, a plurality of air gages having pressure outlets, means connecting one of the inlets of said high-pressure stage to the pressure outlet of one of said air gages, means connecting another of the inlets of said high-pressure stage to the pressure outlet of another of said plurality of air gages, and means connecting the inlets of said low-pressure stage in parallel with the inlets of said high pressure stage.

6. In a system for measuring the highest back-pressure available from a plurality of back-pressure type air gages having back-pressure chambers, the combination comprising a first high pressure determining stage having at least two inputs and a high pressure output; means connecting one of said two inputs to the back-pressure chamber of one of said plurality of air gages; means connecting another of said inputs to the back-pressure chamber of another of said plurality of air gages; a plurality of subsequent high-pressure determining stages including a first subsequent stage having at least two inputs and a high-pressure output, and a final subsequent stage having at least two inputs and a high pressure output; means connecting one input of each of the subsequent high-pressure determining stages to the output of its immediately preceding stages; means individually connecting another of the inputs of each of said subsequent stages to one of the back-pressure chambers of the remainder of said plurality of air gages; and means determining the output pressure of the final subsequent stage.

7. In a system for measuring the lowest back-pressure available from a plurality of back-pressure type air gages having back-pressure chambers, the combination comprising a first low pressure determining stage having at least two inputs and a low pressure output; means connecting one of said two inputs to the back-pressure chamber of one of said plurality of air gages; means connecting another of said inputs to the back-pressure chamber of another of said plurality of air gages; a plurality of subsequent low-pressure determining stages including a first subsequent stage having at least two inputs and a low-pressure output, and a final subsequent stage having at least two inputs and a low pressure output; means connecting one input of each of the subsequent low-pressure determining stages to the output of its immediately preceding stages; means individually connecting another of the inputs of each of said subsequent stages to one of the back-pressure chambers of the remainder of said plurality of air gages; and means determining the output pressure of the final subsequent stage.

8. A system for measuring the flatness of a surface comprising a plurality of air gages fed by a source of compressed air, each of said air gages having a back pressure chamber therein, a first portion of said system including a plurality of pressure actuated selector means for selecting a single maximum back pressure proportional to the smallest spacing between any one of said plurality of air gages and said surface, a second portion of said system including a plurality of pressure actuated other selector means for selecting a single minimum back pressure proportional to the largest spacing between any one of said plurality of air gages and said surface, the first of said selector means of said first portion and the first of said other selector means of said second portion being arranged to compare the outputs of the back pressure chambers of two of said plurality of air gages, the subsequent of said selector means and other selector means being connected in parallel to subsequent of said air gages at the back pressure chambers thereof, and means actuated by the output pressures of said first portion and said second portion to provide a single indication of the flatness of said surfaces.

9. An air gage measuring system including at least three air gages of the back pressure type each having a back pressure chamber therein, a plurality of high pressure selector means operatively connected to said air gages at the back pressure chamber thereof, a plurality of low pressure selector means also operatively connected to said air gages at the back pressure chamber thereof, for selecting the highest and lowest back pressure, respectively, the first of said plurality of high pressure selector means and the first of said plurality of low pressure selector means being connected in parallel to the back pressure chambers of two of said air gages, the second of either selector means being arranged to compare output pressure of said first high and low pressure selector means, respectively, with the back pressure obtained from the back pressure chamber of the third of said air gages, and indicator means actuated by the difference between the final highest and lowest pressure.

References Cited in the file of this patent

UNITED STATES PATENTS

| | | |
|---|---|---|
| 2,551,526 | Campbell | May 1, 1951 |
| 2,761,319 | Whitener et al. | Sept. 4, 1956 |
| 2,777,812 | Powell et al. | Jan. 15, 1957 |
| 2,779,188 | Meyer | Jan. 29, 1957 |
| 2,786,109 | Eskin | Mar. 19, 1957 |